US012804606B2

(12) United States Patent
Wu et al.

(10) Patent No.: US 12,804,606 B2
(45) Date of Patent: Nov. 17, 2026

(54) MONITORING OF A PAGING EARLY INDICATION BASED ON SUBGROUPS OF TERMINAL DEVICES

(71) Applicant: Nokia Technologies Oy, Espoo (FI)

(72) Inventors: Chunli Wu, Beijing (CN); Jussi-Pekka Koskinen, Oulu (FI); Jorma Johannes Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 252 days.

(21) Appl. No.: 18/728,302

(22) PCT Filed: Jan. 28, 2022

(86) PCT No.: PCT/CN2022/074665
§ 371 (c)(1),
(2) Date: Jul. 11, 2024

(87) PCT Pub. No.: WO2023/141960
PCT Pub. Date: Aug. 3, 2023

(65) Prior Publication Data
US 2024/0422735 A1 Dec. 19, 2024

(51) Int. Cl.
*H04W 68/00* (2009.01)
*H04W 52/02* (2009.01)
*H04W 68/02* (2009.01)

(52) U.S. Cl.
CPC ....... *H04W 68/02* (2013.01); *H04W 52/0235* (2013.01)

(58) Field of Classification Search
CPC ... H04W 68/02; H04W 52/0235; H04W 8/22; H04W 52/0216; H04W 52/0219;
(Continued)

(56) References Cited

U.S. PATENT DOCUMENTS

2022/0124674 A1* 4/2022 Babaei .................. H04W 68/02
2023/0017853 A1* 1/2023 Xu ...................... H04W 68/005
(Continued)

FOREIGN PATENT DOCUMENTS

CN 112673685 A 4/2021
WO 2022/007844 A1 1/2022

OTHER PUBLICATIONS

Extended European Search Report received for corresponding European Patent Application No. 22922800.2, dated May 19, 2025, 9 pages.
(Continued)

*Primary Examiner* — Pakee Fang
(74) *Attorney, Agent, or Firm* — McCarter & English LLP

(57) ABSTRACT

Embodiments of the present disclosure relate to devices, methods, apparatuses and computer-readable storage medium for monitoring of a Paging Early Indication (PEI). In some example embodiments, there is provided a method implemented in a terminal device. In the method, the terminal device receives a first indication of a total number of subgroups of terminal devices from a network device. In accordance with a determination that a first value of the first indication equals to a reference value in a first set of reference values or the first indication is absent, the terminal device determined whether a Paging Early Indication (PEI) for a Paging Occasion (PO) is to be detected by the terminal device based on one or more predefined conditions.

18 Claims, 3 Drawing Sheets

(58) Field of Classification Search
CPC ........... H04W 52/0229; H04W 52/028; H04W 68/025; Y02D 30/70
See application file for complete search history.

(56) References Cited

U.S. PATENT DOCUMENTS

| | | | | |
|---|---|---|---|---|
| 2024/0147422 A1* | 5/2024 | Zhao | ..................... | H04W 68/02 |
| 2024/0284404 A1* | 8/2024 | Xie | ........................ | H04W 68/02 |
| 2024/0349245 A1* | 10/2024 | Hu | .................... | H04W 52/0235 |
| 2024/0422737 A1* | 12/2024 | Zhao | ................. | H04W 52/0229 |

OTHER PUBLICATIONS

"Summary of [AT116bis-e][054][ePowSav] Subgrouping and PEI", 3GPP TSG-RAN WG2 Meeting #116bis electronic, R2-2201916, Agenda: 8.9.2.1, MediaTek Inc., Jan. 17-25, 2022, 18 pages.
"Further Consideration on Paging Subgrouping", 3GPP TSG-RAN WG2 Meeting#116bis, R2-2201219, Agenda: 8.9.2.1, ZTE Corporation, Jan. 17-25, 2022, 5 pages.
"Discussion on Potential Paging Enhancements", 3GPP TSG RAN WG1 #104-bis-e, R1-2103310, Agenda: 8.7.1.1, Sony, Apr. 12-20, 2021, 8 pages.
"3rd Generation Partnership Project; Technical Specification Group Radio Access Network; NR; NR and NG-RAN Overall Description; Stage 2 (Release 17)", 3GPP TS 38.300, V17.1.0, Jun. 2022, pp. 1-209.
"Revised WID UE Power Saving Enhancements for NR", 3GPP TSG RAN meeting #88e, RP-200938, Agenda: 9.10.7, MediaTek Inc., Jun. 29-Jul. 3, 2020, 5 pages.
"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.
"3rd Generation Partnership Project; Technical Specification Group Radio Access Network; NR; User Equipment (UE) procedures in Idle mode and RRC Inactive state (Release 16)", 3GPP TS 38.304, V16.7.0, Dec. 2021, pp. 1-39.
"3rd Generation Partnership Project; Technical Specification Group Radio Access Network; NR; Physical layer procedures for control (Release 17)", 3GPP TS 38.213, V17.0.0, Dec. 2021, pp. 1-225.
"Report of 3GPP TSG RAN WG2 meeting #116-e, Online", 3GPP TSG-RAN WG2 meeting #116bis-e, R2-22xxxxx, Agenda: 2.2, ETSI MCC, Nov. 1-12, 2021, pp. 1-377.
"Summary of [AT116bis-e][054][ePowSav] Subgrouping and PEI", 3GPP TSG-RAN WG2 Meeting #116bis electronic, R2-220xxxx, Agenda: 8.9.2.1, MediaTek Inc., Jan. 17-25, 2022, pp. 1-13.
"Introduction of Rel-17 UE power saving enhancements", 3GPP TSG-RAN WG1 Meeting #107-e, R1-2112943, Huawei, Nov. 11-19, 2021, 7 pages.
"3rd Generation Partnership Project, Technical Specification Group Radio Access Network; NR; Multiplexing and channel coding (Release 17)", 3GPP TS 38.212, V17.0.0, Dec. 2021, pp. 1-190.
International Search Report and Written Opinion received for corresponding Patent Cooperation Treaty Application No. PCT/CN2022/074665, dated Oct. 27, 2022, 10 pages.
"Open Issues for PEI and UE Paging Subgrouping", 3GPP TSG-RAN WG2 Meeting #116bis electronic, R2-2200315, Agenda: 8.9.2.1, MediaTek Inc., Jan. 17-25, 2022, pp. 1-7.
"Discussing on UE capability for paging enhancement", 3GPP TSG-RAN WG2 Meeting #116-bis electronic, R2-2200463, Agenda: 8.9.3, Xiaomi Communications, Jan. 2022, pp. 1-4.

* cited by examiner

MONITORING OF A PAGING EARLY INDICATION BASED ON SUBGROUPS OF TERMINAL DEVICES

RELATED APPLICATION

This application claims priority to PCT Application No. PCT/CN2022/074665 filed Jan. 28, 2022, which is incorporated herein by reference in its entirety.

TECHNICAL FIELD

Embodiments of the present disclosure generally relate to the field of telecommunication, and in particular, to a device, method, apparatus and computer-readable storage medium for monitoring of a Paging Early Indication (PEI).

BACKGROUND

With development of communication technology, in order to save the power consumption of the terminal devices in a serving cell, subgrouping for the terminal devices in the serving cell and an early indication of paging for a Paging Occasion (PO) has been introduced. In the context of the invention, such an indication will also be referred to as a Paging Early Indication (PEI). The state of a bit in a subgroup field in the PEI may indicate whether any terminal device in the subgroup corresponding to the bit is paged in the corresponding PO. For example, if the bit is set to one "1", the terminal devices in the corresponding subgroup may wake up to monitor the PO. Else if the bit is set to zero "0", the terminal device in the corresponding subgroup may not wake up. Two subgrouping mechanisms, core network (CN)-assigned based subgroup and user equipment (UE)-identification (ID) based subgroup, have been defined. Moreover, a parameter "SubgroupNumPErPO" indicating the total number of the subgroups and another parameter "subgroupsNumforUEID" indicating the number of subgroups grouped based on UE ID are broadcast on a System Information Block (SIB). In general, the value of the parameter "SubgroupNumPErPO" equals to the number of bits in the subgroup field in the PEI. For efficiency of a communication system, the flexible utilization of these two parameters for determining the terminal devices required to monitor the PEI is a key aspect.

SUMMARY

In general, example embodiments of the present disclosure provide a device, method, apparatus and computer-readable storage medium for a concurrent beam failure.

In a first aspect, there is provided a terminal device. The terminal device comprises at least one processor and at least one memory including computer program code. The at least one memory and the computer program code configured to, with the at least one processor, cause the terminal device to receive a first indication of a total number of subgroups of terminal devices from a network device. The first device is further caused to determine, based on one or more predefined conditions, whether a Paging Early Indication (PEI) for a Paging Occasion (PO) is to be detected by the terminal device in accordance with a determination that a first value of the first indication equals to a reference value in a first set of reference values or the first indication is absent.

In a second aspect, there is provided a method implemented in a terminal device. In the method, the terminal device receive a first indication of a total number of subgroups of terminal devices from a network device. In accordance with a determination that a first value of the first indication equals to a reference value in a first set of reference values or the first indication is absent, the terminal device determined whether a Paging Early Indication (PEI) for a Paging Occasion (PO) is to be detected by the terminal device based on one or more predefined conditions.

In a third aspect, there is provided an apparatus comprising means for performing the method according to the second aspect.

In a fourth aspect, there is provided computer-readable storage medium having instructions stored thereon. The instructions, when executed on at least one processor, cause the least one processor to perform the method according to the second aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
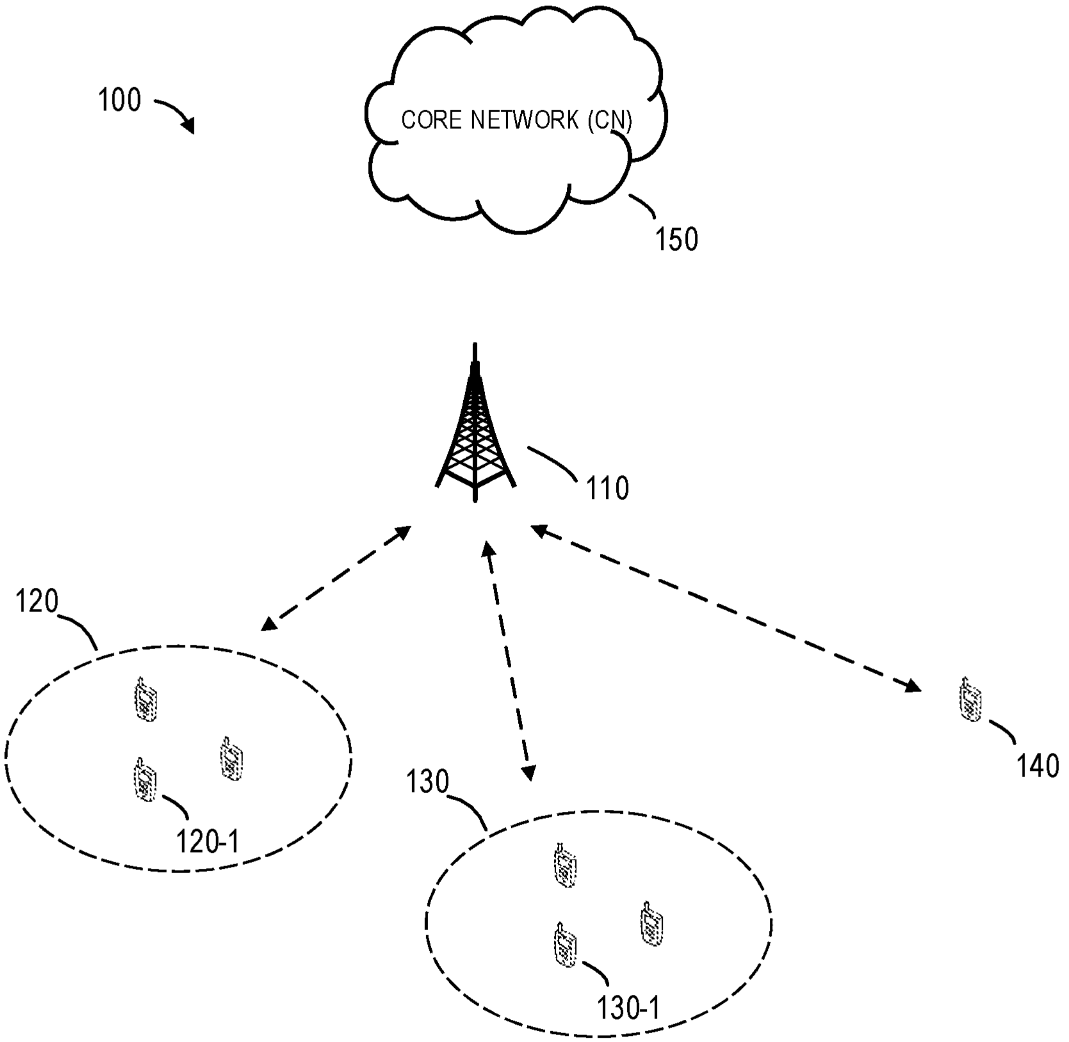
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the terms "network device" and "transmit-receive point (TRP)" refers to a device which is capable of providing or hosting a cell or coverage where a further device, for example a terminal device, can communicate with. Examples of a network device include, but not limited to, a Node B (NodeB or NB), an Evolved NodeB (eNodeB or eNB), a next generation eNB (ng-eNB), a ng-eNB-Central Unit (ng-eNB-CU), a ng-eNB-Distributed Unit (ng-eNB-DU), a next generation NodeB (gNB), a gNB-Central Unit (gNB-CU), a gNB-Distributed Unit (gNB-DU), a Remote Radio Unit (RRU), a radio head (RH), a remote radio head (RRH), an Integrated Access and Backhaul (IAB) node, a low power node such as a femto node or a pico node, a Transmit-Receive Point (TRP), and the like. In some communication systems, the network device may consist of multiple separate entities, for example, in NTN system, the network device may be consist of radio frequency part located in satellites or drones, and inter-frequency/base band part located in ground stations.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, devices for Integrated Access and Backhaul (IAB), or image capture devices such as digital cameras, gaming devices, music storage and playback appliances, or Internet appliances enabling wireless or wired Internet access and browsing and the like. Herein, the term "terminal device" can be used interchangeably with a UE.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As used herein, the singular forms "a", "an" and "the" are intended to include the plural forms as well, unless the context clearly indicates otherwise. The term 'includes' and its variants are to be read as open terms that mean "includes, but is not limited to." The term "based on" is to be read as 'at least in part based on." The term "one embodiment" and "an embodiment" are to be read as "at least one embodiment." The term "another embodiment" is to be read as "at least one other embodiment." The terms "first." "second," and the like may refer to different or same objects.

As mentioned above, two subgrouping mechanisms have been defined. For the subgrouping based on a CN-assignment, the CN directly assigns subgroup ID for a terminal device to the terminal device and informs an associated network device the subgroup ID for the terminal device when the UE is paged. For the subgrouping based on identifications of the terminal devices (such as, "UE-ID"), the terminal device and associated network device may derive the subgroup comprising the terminal device based on the identification of the terminal device. A parameter "SubgroupNumPErPO" is used to indicate the total number of the subgroups. In combination with the another parameter "subgroupsNumforUEID" indicating the number of subgroups divided based on UE ID, terminal devices may further determine the number of subgroups of terminal devices grouped based on the CN assignment. Correspondingly, the number of bits in a "subgroup" field in a PEI for a PO equals to the value of the parameter "SubgroupNumPErPO", such that each bit in the "subgroup" field can indicate a corresponding subgroup of terminal devices to wake up for monitoring of the PO. In a case that the value of the parameter "SubgroupNumPErPO" is one of zero, one or the parameter is absent, the "subgroup" field may comprise only one bit. However, there is no mechanism for distinguishing the case of the parameter "SubgroupNumPErPO" setting to one and setting to zero or absent, although for both cases there is only one bit in the "subgroup" field.

Example embodiments of the present disclosure provide a scheme for monitoring of a Paging Early Indication (PEI) by a terminal device with or without subgrouping capability. In this scheme, predefining a first set of reference values for a first value of a first indication, the first indication indicates a total number of subgroups of terminal devices from a network device. A terminal device is configured with the first indication from a network device. Then, if the monitored first value of the first indication is in the predefined first set of reference values or absent, the terminal device determines that a PEI for a PO is to be detected based on one or more predefined conditions. The one or more predefined conditions comprises at least one of a configured value or absence of the first indication, a configured value or absence of a second indication of the number of subgroups of terminal devices grouped based on identifications of the terminal devices received from the network device, an identification of subgroup of the terminal device assigned by a core network (CN), CN-assignment subgrouping capability of the terminal device, a subgrouping capability based on an identification of the terminal device, or a subgrouping capability of the terminal device.

In this way, from the terminal device side, the terminal device may distinguish the case of the parameter "SubgroupNumPErPO" being set to be one of zero, one or being absent, and determine whether to monitor the PEI for the PO based on predefined conditions. From the network side, utilizing the first indication having values in the predetermined set of values and only one bit in subgroup field, the network device is able to indicate waking up of the subgroup of terminal devices grouped based on CN assignment, the subgroup of terminal devices grouped based on identifications of the terminal devices, the UEs supporting PEI but not supporting subgroup, or any combination of them.

Example embodiments of the present disclosure for monitoring of a Paging Early Indication (PEI) by a terminal device with or without subgrouping capability will be described below with reference to FIGS. 1-3.

FIG. 1 illustrates an example environment 100 in which example embodiments of the present disclosure can be implemented.

The environment 100, which may be a part of a communication network, comprises network device 110, a subgroup 120 of terminal devices grouped based on CN assignment, a subgroup 130 of terminal devices grouped based on identifications of the terminal devices, a terminal device 140 without subgrouping capability but supporting PEI, and a core network 150. The subgroup 120 comprises a terminal device 120-1 and some other terminal devices, and the subgroup 130 comprises a terminal device 130-1 and some other terminal devices. It is to be understood that the number of subgroups, the number of terminal devices, the number of network device are shown in the environment 100 only for the purpose of illustration, without suggesting any limitation to the scope of the present disclosure.

In the environment 100, for example, the terminal device 120-1 may be grouped into the subgroup 120 based on the group ID of the subgroup 120 assigned directly by the CN 150, the CN 150 may further inform the network device 110 the group ID of the terminal device 120-1. The terminal device 130-1 may determine that it was grouped into the subgroup 130 based on the identification of the terminal device 130-1. The network device 110 may also determine that the terminal device 130-1 was grouped into the subgroup 130 in the same way.

The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

Figure 2:
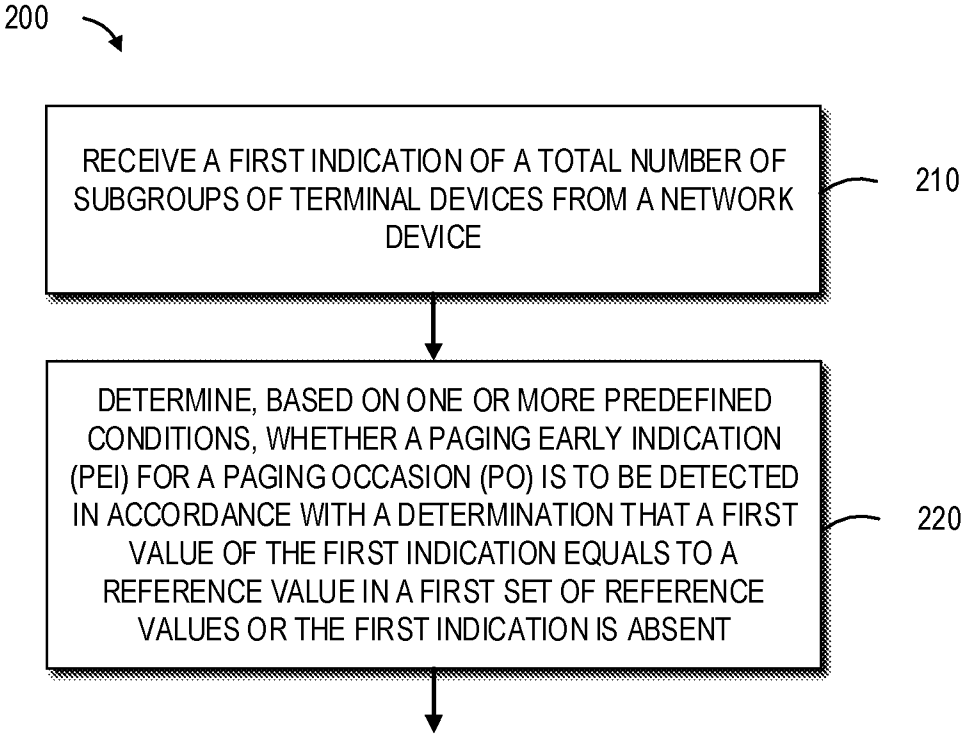
FIG. 2 illustrates a flowchart of an example method implemented at a terminal device in accordance with some embodiments of the present disclosure.

FIG. 2 illustrates a flowchart of an example method implemented at a terminal device in accordance with some embodiments of the present disclosure. For purpose of discussion, the flowchart 200 will be described with reference to FIG. 1.

At block 210, the terminal device 120-1 receives a first indication of a total number of subgroups of terminal devices from the network device 110. In some embodiments, it may be that the terminal device 130-1 or terminal device 140 monitors the first indication. In some embodiments, it may be that any other terminal device enabled PEI capability monitors the first indication.

In some embodiments, the first indication may comprise the parameter "SubgroupNumberPerPO" in a SIB. For example, the first indication may be the parameter "SubgroupNumberPerPO" broadcast in the cells provided in the network device 110. In some embodiments, the first indication may be other message or signaling.

At block 220, in accordance with a determination that a first value of the first indication equals to a reference value in a first set of reference values or the first indication is absent, the terminal device 120-1 determines whether a PEI for a PO is to be detected by the terminal device based on one or more predefined conditions. Correspondingly, in some embodiments, it may be that the terminal device 130-1 or terminal device 140 monitors the first indication and make the determination. In some embodiments, it may be that any other terminal device enabled PEI capability monitors the first indication.

In some embodiments, the first set of reference value may comprise zero and one. In this case, the subgroup field in the PEI may only comprise one bit. The terminal device may determine whether to monitor the PEI for the PO based on the one or more predefined conditions. As such, the terminal device may distinguish the case of SubgroupNumPerPo setting to 1 and 0 or being absent. Further, the network device 110 may schedule the terminal devices with the first indication having values in the predetermined set of values and only one bit in subgroup field. In some embodiments, the first set of reference values may comprise other values in addition to the conventional range from 2 to 8. For example, the first set of reference value may comprise "9", "10", "−1" or any other values predefined on demand.

In some embodiments, the one or more predetermined conditions comprise a configured value or absence of the first indication. For example, if the value of the first indication is set to be zero "0" or the first indication is absent in the SIB, all the terminal devices enabled the PEI may monitor the PEI and determine whether to wake up and monitor the associated PO based on the monitored one bit in the subgroup field of the PEI. For example, if a terminal device supports CN-assignment subgroup (regardless of its CN assigned subgroup ID), or supports UE-ID based subgroup, or supports PEI only but not subgrouping, it will monitor PEI and determine whether to wake up and monitor for the associated PO accordingly. In some embodiments, if the one bit is configured to be "1", theses terminal devices may wake up and monitor the associated PO. Otherwise, if the one bit is configured to be "0", these terminal device may skip monitoring the associated PO. For example, if the one bit is set to be "1", all the terminal devices in the subgroup 120 and subgroup 130, and the terminal device 140 may wake up and monitor the associated PO.

In addition or alternatively, in some embodiment, the terminal device 120-1 determines that it has a subgroup ID assigned by CN, and the number of bits in PEI for CN assignment based subgroup (determined by the values of the first indication and the second indication) is not less than the terminal device 120-1's CN assigned subgroup ID, the monitored PEI by the terminal device 120-1 may be used to determine to monitor PO or monitoring the PO is not based on the bit for the corresponding subgroup in PEI. Otherwise, it skips monitoring PEI and monitors PO directly. For example, there is only one bit in PEI for CN-assigned subgroup (e.g. with value for first indication equals to 1 and the second indication absent), a terminal device with CN-assigned subgroup ID value of 1 (or 0) may monitor PEI and wake up for PO accordingly while other UEs may skip PEI and monitor PO. In another example, the first indication is configured as 8 and second indication for number of subgroups for UE ID based subgroup is 4, which leaves 4 bits in PEI to indicate subgroups of CN-assignment subgroups, a terminal device with CN-assigned subgroup ID value of 5 would skip PEI and monitor PO.

In some embodiments, the terminal device may determine whether to detect the PEI based on the subgrouping capability of the terminal device. For example, the determination may be based on CN-assignment subgrouping capability of the terminal device or the subgrouping capability based on an identification of the terminal device. In an example, after the determination that the first value of the first indication is equal to a reference value in a first set of reference values, if the terminal device (for example, the terminal device 120-1) is grouped into a subgroup based on CN-assignment, the terminal device 120-1 may determine that the PEI is to be detected, and determine whether to wake up and monitor the PO based on the monitored PEI. In this case, other terminal devices enabled the PEI, for example, the terminal device 130-1 and 140, may directly wake up and monitor the POs. In another example, after the determination that the first value of the first indication is equal to a reference value in a first set of reference values (for example, the terminal device 130-1), the terminal device 130-1 may determine that the PEI is to be detected, and determine whether to wake up and monitor the PO based on the monitored PEI. In this case, other terminal devices enabled the PEI, for example, the terminal device 120-1 and 140, may directly wake up and monitor the POs. In yet another example, after the determination that the first value of the first indication is equal to a reference value in a first set of reference values, if the terminal device being enabled subgrouping (for example, the terminal device 120-1 and 130-1), the terminal devices 120-1 and 130-1 may determine that the PEI is to be detected, and determine whether to wake up and monitor the PO based on the monitored PEI. In this case, other terminal devices (for example, the terminal device 140) may directly wake up and monitor the POs.

In addition or alternatively, in some embodiments, there may be a predefined subgroup based on CN-assignment. For example, the CN may group terminal devices into a predefined subgroup based on the capabilities of the terminal devices. For example, some terminal devices may have low paging probability, the CN may assign these terminal devices into the subgroup 120 save power for them. In this case, if determining that the first parameter is in a predetermined range, for example, zero or one, the terminal devices in the subgroup 120 may monitor the PEI and determine whether to wake up and monitor the POs. Moreover, terminal devices in other subgroups or terminal devices without subgrouping capability may directly wake up and monitor the POs.

In addition or alternatively, in some embodiments, the one or more predefined conditions comprise a configured value or absence of a second indication of the number of subgroups of terminal devices grouped based on identifications of the terminal devices received from the network device. In some embodiments, the second indication comprises subgroupsNumforUEID in the SIB. For example, the second indication may be the parameter “subgroupsNumforUEID” broadcast in the cells provided in the network device 110. In some embodiments, the second indication may be other message or signaling.

In some embodiments, if it is determined that the first value of the first indication equals to a first reference value, for example, one “1”, terminal devices may determine the PEI is to be detected based on determining whether a second value of the second indication equals to a reference value in a second set of reference values or is absent. In some embodiments, the second set of reference values may comprise zero and one. In some embodiments, the second set of reference values may comprise other predefined values.

For example, if the first value of the first indication equals to a first reference value in the first set of references, for example, one “1”, the terminal device (for example, the terminal device 120-1) further determines whether the second value of the second indication equals to zero “0”, one “1” or is absent. In one example, if the value of the second indication equals to zero or is absent, the terminal devices (for example, the terminal device 120-1) in the subgroup 120 which is grouped based on CN-assignment may determine that the PEI is to be detected, and determine whether to wake up and monitor the POs based on the monitored PEI. In this case, other terminal devices enabled the PEI (for example, terminal devices in the subgroup 130 and the terminal device 140) may directly wake up and monitor the POs.

In another example, if the value of the second indication equals to one “1”, the terminal devices (for example, the terminal device 130-1) in the subgroup 130 which is grouped based on terminal identifications of the terminal devices may determine that the PEI is to be detected, and determine whether to wake up and monitor the POs based on the monitored PEI. In this case, other terminal devices enabled the PEI (for example, terminal devices in the subgroup 120 and the terminal device 140) may directly wake up and monitor the POs.

In a further example, there may be a predefined subgroup based on CN-assignment. For example, the CN may group terminal devices into a predefined subgroup based on the capabilities of the terminal devices. After the first value of the first indication equals to a first reference value in the first set of references, for example, one “1”, if the value of the second indication equals to zero or is absent, terminal devices in this predefined subgroup which is grouped based on the capabilities of the terminal devices may determine that the PEI is to be detected, and determine whether to wake up and monitor the POs based on the monitored PEI. In this case, other terminal devices enabled the PEI (for example, terminal devices in the subgroup 120, terminal devices in other subgroup grouped based on CN-assignment and the terminal device 140) may directly wake up and monitor the POs.

In addition or alternatively, if the value of the second indication equals to first, terminal devices in this predefined subgroup which is grouped based on the capabilities of the terminal devices may determine that the PEI is to be detected, and determine whether to wake up and monitor the POs based on the monitored PEI. In this case, other terminal devices enabled the PEI (for example, terminal devices in the subgroup 120, terminal devices in other subgroup grouped based on CN-assignment and the terminal device 140) may directly wake up and monitor the POs.

It is to be understood that the above embodiments with respect to the first indication, second indication and the one or more predetermined conditions are only examples. There may other combinations between these items for controlling the monitoring the PEI by the terminal devices enabled PEI. For the sake of simplifying, other embodiments are not discussed in detail.

In this way, there may be at least three advantages for the communication system: no need to introduce separate field in PEI for terminal devices enabled the PEI without subgrouping capabilities; enabling the network device to control only CN-assigned subgroup of terminal devices, only UE-ID based subgroup of terminal devices or both utilizing one bit subgroup field; and specifies the behavior for terminal devices enabled the PEI without subgrouping capabilities in a case that the network device supports no subgrouping, one subgroup or more than one subgroup.

Figure 3:
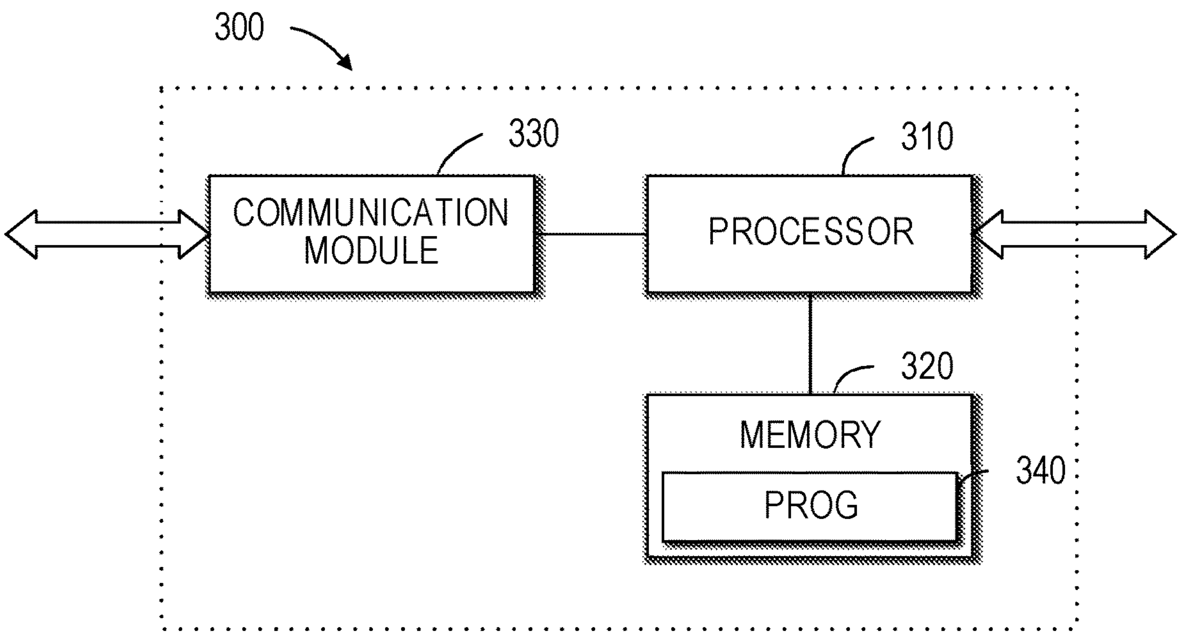
FIG. 3 is a simplified block diagram of a device that is suitable for implementing embodiments of the present disclosure.

FIG. 3 is a simplified block diagram of a device 300 that is suitable for implementing example embodiments of the present disclosure. The device 300 can be implemented at the terminal device 120 and the TRP 110 as shown in FIG. 1.

As shown, the device 300 includes a processor 310, a memory 320 coupled to the processor 310, a communication module 330 coupled to the processor 310, and a communication interface (not shown) coupled to the communication module 330. The memory 320 stores at least a program 340. The communication module 330 is for bidirectional communications, for example, via multiple antennas or via a cable. The communication interface may represent any interface that is necessary for communication.

The program 340 is assumed to include program instructions that, when executed by the associated processor 310, enable the device 300 to operate in accordance with the example embodiments of the present disclosure, as discussed herein with reference to FIGS. 1 to 2. The example embodiments herein may be implemented by computer software executable by the processor 310 of the device 300, or by hardware, or by a combination of software and hardware. The processor 310 may be configured to implement various example embodiments of the present disclosure.

The memory 320 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 320 is shown in the device 300, there may be several physically distinct memory modules in the device 700. The processor 310 may be of any type suitable to the local technical network, and may include one or more of general purpose computers, special purpose computers, microprocessors, digital signal processors (DSPs) and processors based on multicore processor architecture, as non-limiting examples. The device 300 may have multiple processors, such as an application specific integrated circuit chip that is slaved in time to a clock which synchronizes the main processor.

When the device 300 acts as the terminal device 120, the processor 310 may implement the operations or acts of the first device 120 as described above with reference to FIGS. 1 and 2. When the device 300 acts as the TRP 110, the processor 310 may implement the operations or acts of the TRP 110 as described above with reference to FIGS. 1 and 2. All operations and features as described above with reference to FIGS. 1 to 2 are likewise applicable to the device 300 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the operations and acts as described above with reference to FIGS. 1 to 6. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a terminal device comprises at least one processor; and at least one memory including computer program code; and the at least one memory and the computer program code configured to, with the at least one processor, cause the terminal device to receive a first indication of a total number of subgroups of terminal devices from a network device; and in accordance with a determination that a first value of the first indication equals to a reference value in a first set of reference values or the first indication is absent, determine, based on one or more predefined conditions, whether a Paging Early Indication (PEI) for a Paging Occasion (PO) is to be detected by the terminal device.

In some embodiments, the first indication comprises SubgroupNumPerPO in a system information block (SIB).

In some embodiments, the one or more predefined conditions comprise at least one of: a configured value or absence of the first indication, a configured value or absence of a second indication of the number of subgroups of terminal devices grouped based on identifications of the terminal devices received from the network device, an identification of subgroup of the terminal device assigned by a core network (CN), CN-assignment subgrouping capability of the terminal device, a subgrouping capability based on an identification of the terminal device, or a subgrouping capability of the terminal device.

In some embodiments, the terminal device is caused to determine that the PEI is to be detected by: in response to the first indication being received from the network device, determining whether the first value of the first indication equals to a first reference value in the first set of reference values; in accordance with a determination that the first value of the first indication equals to the first reference value, determining a second indication of the number of subgroups of terminal devices grouped based on identifications of terminal devices from the network device; and determining, based on the second indication, that the PEI is to be detected.

In some embodiments, the terminal device is caused to determine that the PEI is to be detected by: in accordance with a determination that a second value of the second indication equals to a third reference value in a second set of reference values and the terminal device is comprised in a subgroup of terminal devices grouped based on the identification of the terminal device, determining that the PEI for the PO is to be detected.

In some embodiments, the terminal device is caused to determine that the PEI is to be detected by: in accordance with a determination that a second value of the second indication equals to a fourth reference value in the second set of reference values or the second identification is absent and the terminal device is comprised in a subgroup of terminal devices grouped based on a core network assignment, determining that the PEI for the PO is to be detected.

In some embodiments, the terminal device is caused to determine that the PEI is to be detected by: in accordance with a determination that a second value of the second indication equals to a fourth reference value in the second set of reference values or the second identification is absent and the terminal device is comprised in a predefined subgroup of terminal devices grouped based on a core network assignment, determining that the PEI for the PO is to be detected.

In some embodiments, the second indication comprises subgroupsNumforUEID of the SIB.

In some embodiments, the second set of reference values comprises zero and one.

In some embodiments, the terminal device is caused to determine that the PEI is to be detected by: in response to the first indication being received from the network device, determine whether the value of the first indication is in the predetermined range; in accordance with a determination that the value of the first parameter is in the predetermined range, determining whether the terminal device is comprised in predefined subgroup of terminal devices; and in accordance with a determination that a second value of the second indication equals to a fourth reference value in the second set of reference values or the second identification is absent and the terminal device is comprised in a predefined subgroup of terminal devices grouped based on a core network assignment, determining that the PEI for the PO is to be detected.

In some embodiments, the second indication comprises subgroupsNumforUEID of the SIB.

In some embodiments, the second set of reference values comprises zero and one.

In some embodiments, the terminal device is caused to determine that the PEI is to be detected by: in response to the first indication being received from the network device, determine whether the value of the first indication is in the predetermined range; in accordance with a determination that the value of the first parameter is in the predetermined range, determining whether the terminal device is comprised in predefined subgroup of terminal devices; and in accordance with a determination that the terminal device is comprised in the predefined subgroup of terminal devices, determining that the PEI for the PO is to be detected.

In some embodiments, the predefined subgroup of terminal devices is a subgroup of terminal devices grouped by a core network based on capabilities of the terminal devices.

In some embodiments, the terminal device is further caused to: in accordance with a determination that the PEI for the PO is not to be detected, wake up and monitor the PO.

In some embodiments, the first set of reference value comprises zero and one, and the PEI comprises one bit.

In some aspects, an apparatus implemented in a terminal device comprises: means for receiving a first indication of a total number of subgroups of terminal devices from a network device; and means for determining, based on one or more predefined conditions, whether a Paging Early Indication (PEI) for a Paging Occasion (PO) is to be detected by the terminal device in accordance with a determination that a first value of the first indication equals to a reference value in a first set of reference values or the first indication is absent.

In some embodiments, the apparatus further comprises: means for in response to the first indication being received from the network device, determining whether the first value of the first indication equals to a first reference value in the first set of reference values; means for in accordance with a determination that the first value of the first indication equals to the first reference value, determining a second indication of the number of subgroups of terminal devices grouped based on identifications of terminal devices from the network device; and means for determining, based on the second indication, that the PEI is to be detected.

In some embodiments, the apparatus further comprises: means for in accordance with a determination that a second value of the second indication equals to a third reference value in a second set of reference values and the terminal device is comprised in a subgroup of terminal devices grouped based on the identification of the terminal device, determining that the PEI for the PO is to be detected.

In some embodiments, the apparatus further comprises: means for in accordance with a determination that a second value of the second indication equals to a fourth reference value in the second set of reference values or the second identification is absent and the terminal device is comprised in a subgroup of terminal devices grouped based on a core network assignment, determining that the PEI for the PO is to be detected.

In some embodiments, the apparatus further comprises: means for in accordance with a determination that a second value of the second indication equals to a fourth reference value in the second set of reference values or the second identification is absent and the terminal device is comprised in a predefined subgroup of terminal devices grouped based on a core network assignment, determining that the PEI for the PO is to be detected.

In some embodiments, the apparatus further comprises: means for in response to the first indication being received from the network device, determining whether the value of the first indication is in the predetermined range; means for in accordance with a determination that the value of the first parameter is in the predetermined range, determining whether the terminal device is comprised in predefined subgroup of terminal devices; and means for in accordance with a determination that the terminal device is comprised in the predefined subgroup of terminal devices, determining that the PEI for the PO is to be detected.

In some embodiments, the apparatus further comprises: means for in accordance with a determination that the PEI for the PO is not to be detected, wake up and monitor the PO.

What is claimed is:

1. A terminal device, comprising:

at least one processor; and at least one memory including program code;

the at least one memory and the program code configured to, with the at least one processor, cause the terminal device at least to:

receive a first indication of a total number of subgroups of terminal devices from a network device; and in accordance with a determination that a first value of the total number of subgroups indicated by the first indication equals to a reference value in a first set of reference values for the total number of subgroups or that the first indication is absent, determine whether a paging early indication for a paging occasion is to be detected by the terminal device, wherein the terminal device is caused to determine that the paging early indication is to be detected by:

determining a second indication of the total number of subgroups of terminal devices grouped based on identifications of terminal devices from the network device; and in accordance with a determination that the first value equals to one, a second value of the total number of subgroups indicated by the second indication equals to zero or the second identification is absent, and the terminal device is comprised in a subgroup of terminal devices grouped based on a core network assignment, determining that the paging early indication for the paging occasion is to be detected.

2. The terminal device of claim 1, wherein the first indication comprises SubgroupNumPerPO in a system information block.

3. The terminal device of claim 1, wherein the second indication comprises subgroupsNumforUEID in a system information block.

4. The terminal device of claim 1, wherein the terminal device is caused to determine that the paging early indication is to be detected by:

in accordance with a determination that the second value one and that the terminal device is comprised in a subgroup of terminal devices grouped based on the identification of the terminal device, determining that the paging early indication for the paging occasion is to be detected.

5. The terminal device of claim 1, wherein the terminal device is further caused at least to:

in accordance with a determination that the paging early indication for the paging occasion is not to be detected, wake up and monitor the paging occasion.

6. The terminal device of claim 1, wherein the first set of reference value comprises zero and one, and the paging early indication comprises one bit.

7. A method, comprising:

receiving, by a terminal device, a first indication of a total number of subgroups of terminal devices from a network device; and in accordance with a determination that a first value of the total number of subgroups indicated by the first indication equals to a reference value in a first set of reference values for the number of subgroups or that the first indication is absent, determining whether a paging early indication for a paging occasion is to be detected by the terminal device, wherein the terminal device is caused to determine that the paging early indication is to be detected by:

determining a second indication of the total number of subgroups of terminal devices grouped based on identifications of terminal devices from the network device; and in accordance with a determination that the first value equals to one, a second value of the total number of subgroups indicated by the second indication equals to zero or the second identification is absent, and the terminal device is comprised in a subgroup of terminal devices grouped based on a core network assignment, determining that the paging early indication for the paging occasion is to be detected.

8. The method of claim 7, wherein the first indication comprises SubgroupNumPerPO in a system information block.

9. The method of claim 7, wherein the second indication comprises subgroupsNumforUEID in a system information block.

10. The method of claim 7, wherein the paging early indication is determined to be detected by:

in accordance with a determination that the second value equals one and that the terminal device is comprised in a subgroup of terminal devices grouped based on the identification of the terminal device, determining that the paging early indication for the paging occasion is to be detected.

11. The method of claim 7, further comprising:

in accordance with a determination that the paging early indication for the paging occasion is not to be detected, waking up and monitoring the paging occasion.

12. The method of claim 7, wherein the first set of reference value comprises zero and one, and the paging early indication comprises one bit.

13. A non-transitory computer-readable storage medium having computer-executable program code portions stored therein, the computer-executable program code portions including program code instructions configured to cause at least:

receiving, by a terminal device, a first indication of a total number of subgroups of terminal devices from a network device; and in accordance with a determination that a first value of the total number of subgroups indicated by the first indication equals to a reference value in a first set of reference values for the total number of subgroups or that the first indication is absent, determining whether a paging early indication for a paging occasion is to be detected by the terminal device, wherein the terminal device is caused to determine that the paging early indication is to be detected by:

determining a second indication of the total number of subgroups of terminal devices grouped based on identifications of terminal devices from the network device; and in accordance with a determination that the first value equals to one, a second value of the total number of subgroups indicated by the second indication equals to zero or the second identification is absent, and the terminal device is comprised in a subgroup of terminal devices grouped based on a core network assignment, determining that the paging early indication for the paging occasion is to be detected.

14. The non-transitory computer-readable storage medium of claim 13, wherein the first indication comprises SubgroupNumPerPO in a system information block.

15. The non-transitory computer-readable storage medium of claim 13, wherein the second indication comprises subgroupsNumforUEID in a system information block.

16. The non-transitory computer-readable storage medium of claim 13, wherein the paging early indication is determined to be detected by:

in accordance with a determination that the second value equals one and that the terminal device is comprised in a subgroup of terminal devices grouped based on the identification of the terminal device, determining that the paging early indication for the paging occasion is to be detected.

17. The non-transitory computer-readable storage medium of claim 13, wherein the computer-executable program code portions including program code instructions are further configured to cause at least:

in accordance with a determination that the paging early indication for the paging occasion is not to be detected, wake up and monitor the paging occasion.

18. The non-transitory computer-readable storage medium of claim 13, wherein the first set of reference value comprises zero and one, and the paging early indication comprises one bit.

* * * * *